July 31, 1962 TOSHIO CHYO 3,047,083
WEIGHING BALANCE

Filed May 21, 1958 3 Sheets-Sheet 2

INVENTOR.
Toshio Chyo.
BY
Morgan Finnegan Durham & Pine
Attorneys.

July 31, 1962     TOSHIO CHYO     3,047,083
WEIGHING BALANCE

Filed May 21, 1958                                  3 Sheets—Sheet 3

INVENTOR.
Toshio Chyo.

United States Patent Office 3,047,083
Patented July 31, 1962

3,047,083
WEIGHING BALANCE
Toshio Chyo, 262 Kashiracho, Kamichojamachi-Agaru, Nishinotoindori, Kamigyoku, Kyoto, Japan
Filed May 21, 1958, Ser. No. 736,844
4 Claims. (Cl. 177—150)

This invention relates to a weighing balance in which counter-weights are automatically deposited on the scale in accordance with the weight of a substance to be weighed.

Usual weighing balances possess three knife edges: one at the center pivot of the balance beam and one at each end of the beam where the respective scales are hung. When the balance is not in use these three knife edges are detached from the respective receiving surface or the like to be stored in a disengaged position. In being used for weighing and after the substance to be weighed is placed on a pan, the handle for disengaging the beam is turned to place these knife edges in contact with their respective receiving members, so that the discrepancy of weight between the substance to be weighed and the counter-weights may be determined by inclination of the beam under the condition in which the beam is free to oscillate.

This invention has among its objects means to deposit automatically on the scale counter-weights having approximately the same weight as that of the substance being weighed, this being accomplished, before the beam is loaded, and while the balance is in its resting state. According to this invention rapid weighing is rendered possible because the time of operation of the apparatus is extremely shortened. In addition to this, the knife edges may be prevented from wearing out and sensitivity and accuracy may be maintained for a long time.

In order to attain the above object, the weighing balance according to this invention is provided with an element having electric resistance or electric capacity which varies as a function of stress produced by loading, and also includes means for producing mechanical energy according to the electric resistance or electric capacity of said element and means for depositing on the scale counter-weights related to and deposited by said mechanical energy.

Other objects of this invention will appear from the following specification and the novel features will be particularly pointed out in the claims at the end thereof.

A weighing balance according to this invention is illustrated by way of example in the accompanying drawings, in which.

Figure 1:
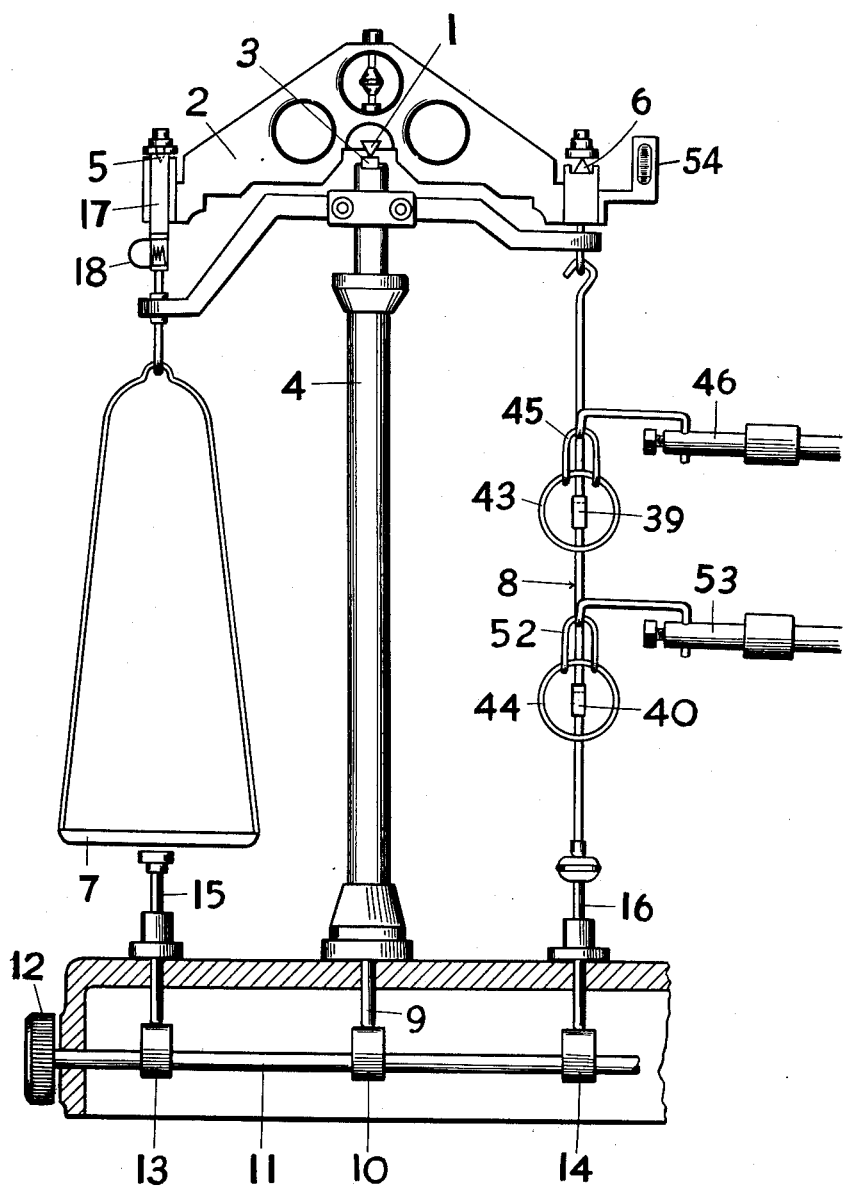
FIGURE 1 is a front view of a weighing balance according to this invention.

Referring to the drawings, a knife edge 1 at the center of the weighing beam 2 is supported by a receiving surface 3 at the top of the main pillar 4 of the balance. Two knife edges 5, 6 at the ends of the beam 2 support respectively a suspended pan 7 for the substance to be weighed and a suspended scaling member 8 for counter-weights. Each knife edge 3, 5, 6 is in contact with or separates from its own receiving member by the vertical shifting of an arresting shaft 9 which passes through the pillar 4. 10 is a cam plate for imparting vertical shifting to the arresting shaft 9, 11 is a handle shaft for rotating the cam plate 10 and 12 is a knob for the handle shaft 11. The handle shaft 11 has also two other cam plates 13, 14, which enable the pan 7 and the scaling member 8 to be respectively supported by vertically displaceable arresters 15, 16.

Figure 2:
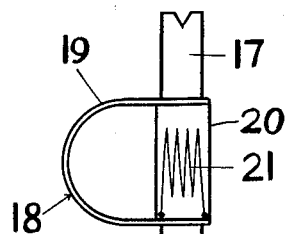
FIGURE 2 shows a resistance wire as an example of the arrangement by which the electric resistance varies according to the applied stress and, which is used in the apparatus according to the invention.
Figure 3:
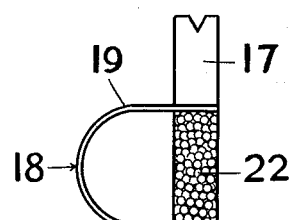
FIGURE 3 shows another exemplary arrangement in which the electric resistance varies according to the applied stress.

According to this invention, the weighing pan 7 is supported by a holding member, a part of which is formed with an element having electrical resistance. The electric resistance of the element varies in accordance with the weight of the weighing material. In FIGURE 1 is shown a suspender 17 as the holding member of the weighing pan 7. The suspender 17 is provided with an electrical resistive element 18 connected to one end of the suspender. As for the substance of resistance 18 any material, as long as it produces the abovementioned effect, may be used. In FIGURES 1, 2, the resistance element consists of a U-shaped flexible plate 19 between both ends of which is inserted and mounted a resistance plate 20 with a zigzag shaped resistance wire 21. A resistance wire such as one used in a resistance wire strain meter is available for this purpose. In FIGURE 3 a tube of carbon grains 22 is mounted in place of the resistance plate 20 of FIGURE 2 to serve as the resistance element.

Figure 4:
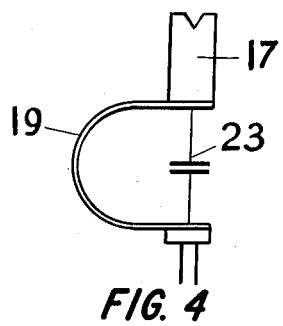
FIGURE 4 shows an exemplary arrangement in which the electric capacity varies according to the applied stress and, which may be used in the apparatus according to the invention.

According to this invention, an element having electric capacity which varies according to the weight of the weighing material may also be used instead of the above stated electrical resistance elements 18. FIGURE 4 shows a U-shaped flexible plate 19 between both ends of which a condenser 23 is inserted as an example of this arrangement.

The operation of the apparatus according to this invention is as follows: At the outset, the balance beam 2, the pan 7 for receiving the substance to be weighed and the scale member 8 for the counter-weights are in their resting positions respectively. In this state a material to be weighed is placed on the weighing pan 7. The handle shaft 11 is then turned to separate the pan 7 and the scale member 8 from the respective arrestors 15, 16 in order to release them, while the balance beam 2 is still supported on the arresting shaft 9, the handle 11 having not yet been turned through a sufficiently large angle. The tensile force applied to the suspender 17 by the weight of the material on the pan 7 produces tensile stress in the resistance element 18 or a change in the charge on capacitive element 23. If a fixed voltage is imposed across both ends of the resistance 18, there is produced an electric current proportionate to the weight of the material on the pan 7 because the electric resistance of element 18 varies according to the weight of the weighing material. In the examples of FIGURES 2, 3 the electric resistance varies relative to the tensile stress or strain in the resistance wire 21 or carbon grains 22, while in the example of FIGURE 4 the electric capacity varies relative to the tensile strain in the condenser 23, this resulting from the variation of the distance between the two metal plates of the condenser 23. In the latter case there may also be obtained an electric current related to the weight of the weighing material.

Figure 5:
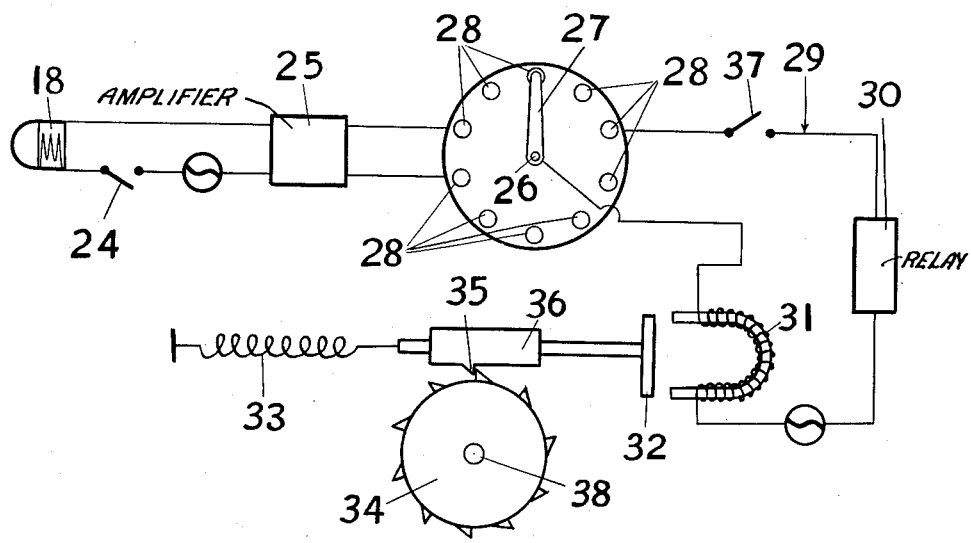
FIGURE 5 is a diagrammatical showing of an apparatus for producing mechanical energy in accordance with the electric resistance of the ararngement shown in FIGURE 2.

According to the present invention, by producing electric current of an amount according to the weight of the load, counter-weights counter-poising roughly the weighing material are automatically placed onto the weight scale. FIGURE 5 illustrates an apparatus for realizing the above effect by way of example.

At the same time as the weighing pan 7 is released from its rest position by turning the handle shaft 11, the switch 24 is turned on to apply an A.C. voltage to the resistance 18. Though not shown in figures, the switch 24 is connected to the handle shaft 11 so as to be turned on or off by its turning. The current produced thereafter is inversely proportional to the electric resistance of the element 18, which resistance varies relative to the weight of load as described before. The current is amplified by an amplifier 25 and transferred to an apparatus for generating torque so as to rotate its shaft 26. The rotating shaft 26 is provided with a rotary arm 27. Accordingly, the rotary angle of the arm 27 is proportionate to the electric current intensity produced. The arm 27 serves as a contact-maker for a number of contact points 28, which are arranged in order in a circle around the rotating shaft 26. Each time the contact of rotary arm 27 touches one of the contact points 28, a circuit 29 comprising the contact points 28, a relay 30, an electro-magnet 31 and the rotary arm 27 is closed, and thereby an armature (an iron piece) 32 is attracted to the electromagnet 31. As soon as the arm 27 moves off a contact point 28, the armature 32 returns to its original position by the force of a spring 33. When the armature 32 reciprocates one stroke, a ratchet 34, which is provided at such a position as to engage with the pawl 35 of the armature rod 36 during the attracting stroke of the armature 32, moves one ratchet angle. The ratchet wheel 34 is constructed as an irreversible mechanism. The rotary angle of the ratchet wheel 34, therefore, is in proportion to the number of times the armature reciprocates, it is thus related to the rotary angle of the arm 27, and consequently, to the weight of the substance to be weighed. 37 is a switch for the circuit 29, which is closed in operation.

Figure 6:
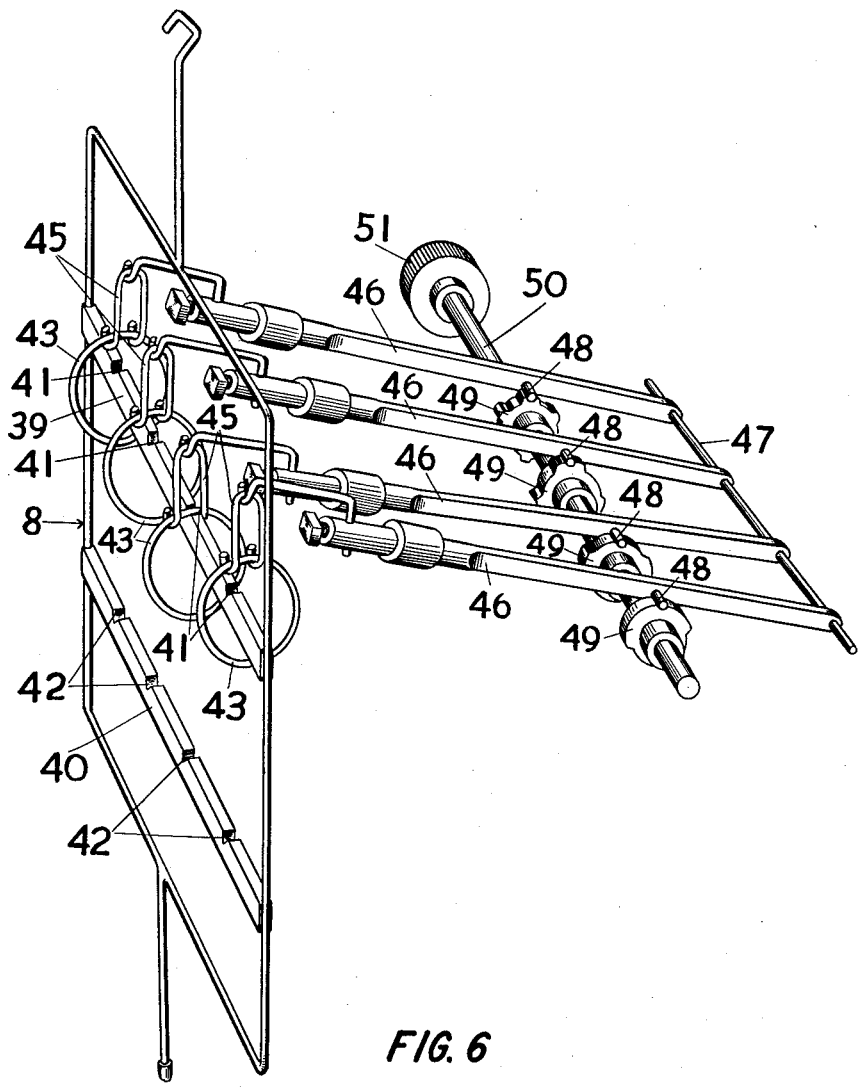
FIGURE 6 is a perspective view of an apparatus for loading the scale with counter-weights in accordance with the mechanical energy which is produced by the apparatus as shown in FIGURE 5.

The rotary shaft 38 of the ratchet wheel 34 is connected to the weight manipulating handle shaft. The shaft 38 itself may also be used as the manipulating shaft. According to this invention, there is thus provided an apparatus for placing on the scale counter-weights having a weight related to the turning angle of the weight manipulating shaft this placing of weights being accomplished by the turning of the manipulating shaft. As for the apparatus for manipulating counter-weights, any one of well-known mechanisms may be used. FIGURE 6 illustrates means for manipulating counter-weights by way of example, which is one of already-known mechanisms.

The scale member 8 for counter-weights consists of two scale bars 39, 40, each of which is provided with several V-shaped dents 41, 42 for the respective ring weights 43, 44. Each ring weight 43 is hung by a hook 45, which is supported by its own manipulating lever 46. Each manipulating lever 46 at one end is pivoted on a single shaft 47 so as to turn around the shaft 47. These manipulating levers 46 are provided at their substantially middle point with respective pins 48, which are always in contact with respective cams 49. These cams 49 are mounted on a single shaft 50. This shaft 50 is the weight manipulating shaft. 51 is the knob of the manipulating shaft 50.

When the manipulating shaft 50 is turned, some of manipulating levers 46 move upward to disengage the ring weights 43 from the scale bar 39 while others move downward to deposit their ring weights 43 on the scale bar 39, this being accomplished by the operation of cams 49. The number of the ring weights which are deposited on the scale 39 depends upon the angle of the manipulating shaft 50 since the several cams 49 have different phases and forms with respect to each other. The same mechanism as stated above is also applied to the lower scale. 52 and 53 in FIGURE 1 show respectively hooks for the ring weights 44 for the lower scale 40 and their own manipulating levers. The manipulating shaft (not shown in FIGURES) for the lower scale weights is connected with the upper manipulating shaft 50 as by gearing so as to turn at the same time.

As already stated before, the weight manipulating shaft 50 is connected to the rotation shaft 38 of the ratchet wheel 34. The weight manipulating shaft 50 is, therefore, automatically turned by the effect as described herein before, and consequently, on the weight scale 8 there are automatically deposited counter-weights roughly counter-poising the weight of the weighing material on the pan 7.

After placing on the scale counter-weights roughly counterpoising the weight of the weighing material as stated above, the handle shaft 11 is turned to release the arresting shaft 9 by the rotation of arresting cam 10, until the balance beam 2 is released completely from resting, each knife edge 1, 5, 6 being in contact with its own receiving surface or the like. In this instance vibration of the beam 2 is not so large because approximately the same weight is loaded at the both ends of the beam 2. Thereafter, precise weighing is performed by measuring the angle of inclination of the balance beam 2 which is caused by the small difference of weight between the weighing material and counterweights. The optical magnifying system may preferably be used for measure of the angle of inclination. 54 in FIGURE 1 is an optical scale which is provided at one end of the beam 2.

It will be easily understood from the above descriptions that the present invention provides the great advantages of extreme shortness of weighing time and mitigation of deterioration in precision which is caused by wear of knife edges or by distortion of the balance beam resulting from long weighing operations.

This invention in its broader aspects is not limited to the specific combination and improvements described, but departure may be made therefrom within the scope of the accompanying claims without departing from the principles of the invention and without sacrificing its chief advantages.

What I claim is:

1. In weighing balance apparatus, the combination with a balance beam, and first and second scales for receiving the substance to be weighed and for counter-weights respectively, of an electric sensing device responsive to the weight of said substance, said sensing device including a strain gage operatively associated with said first scale and having an electric parameter which is responsive to said weight of said substance during the condition when said balance beam is held at rest, means for holding and releasing said balance beam, drive means responsive to changes in said electrical parameter and means operative to cause the output of said drive means to deposit counter-weights roughly equal to the weight of said substance on said second scale before the balance beam is released from its rest position.

2. Weighing balance apparatus according to claim 1, in which the strain gage comprises a U-shaped flexible plate with a resistance element between its ends, the resistance element being provided with a resistance wire.

3. A weighing balance according to claim 1 in which said sensing device includes a cylinder containing carbon grains and said parameter is the resistance of said grains.

4. In weighing balance apparatus, the combination with a balance beam and first and second scales for receiving the substance to be weighed and for counter-weights respectively, of an electric sensing device responsive to the weight of said substance, said sensing device including a variable capacitor operatively associated with said first scale and having a capacity which is responsive to said weight of said substance during the condition when said balance beam is held at rest, means for holding and releasing said balance beam drive means responsive to changes in said capacity and means operative to cause the output of said drive means to deposit counter-weights roughly equal to the weight of said substance on said second scale before the balance beam is released from its rest position.

(References on following page)

References Cited in the file of this patent

UNITED STATES PATENTS

| | | |
|---|---|---|
| 313,468 | Becker | Mar. 10, 1885 |
| 2,377,869 | Elliott | June 12, 1945 |
| 2,419,061 | Emery | Apr. 15, 1947 |
| 2,467,752 | Howe | Apr. 19, 1949 |
| 2,766,981 | Lauler | Oct. 16, 1956 |
| 2,812,172 | Whitcroft | Nov. 5, 1957 |

FOREIGN PATENTS

| | | |
|---|---|---|
| 457,295 | Great Britain | Nov. 25, 1936 |
| 699,886 | Great Britain | Nov. 18, 1953 |
| 1,004,822 | Germany | Mar. 21, 1957 |